United States Patent [19]
Rundle

[11] Patent Number: 5,123,593
[45] Date of Patent: Jun. 23, 1992

[54] MANUAL OVERRIDE HEAT SENSITIVE VALVE

[76] Inventor: Gregory E. Rundle, No. 8 - 4800 Trimaran Drive, Richmond, British Columbia, Canada, V7E 4T2

[21] Appl. No.: 468,897

[22] Filed: Jan. 23, 1990

[51] Int. Cl.⁵ .......................................... G05D 23/02
[52] U.S. Cl. ........................... 236/93 B; 236/101 D
[58] Field of Search ............. 236/93 B, 93 R, 101 D; 137/457

[56] References Cited

U.S. PATENT DOCUMENTS

| | | | |
|---|---|---|---|
| 2,556,777 | 6/1951 | Reimuller | 236/93 B X |
| 3,396,479 | 8/1968 | Troutman | 137/603 |
| 3,648,724 | 3/1972 | Lloyd | 137/467 |
| 3,791,409 | 2/1974 | Rush | 137/597 |
| 3,870,080 | 3/1975 | Landwehr | 137/636.4 |
| 3,952,594 | 4/1976 | McMahan | 73/349 |
| 4,210,284 | 7/1980 | Tarnay et al. | 239/75 |
| 4,281,790 | 8/1981 | McGinnis | 236/93 B |
| 4,480,784 | 11/1984 | Bennett | 236/93 B |
| 4,570,848 | 2/1986 | McLellan | 236/12.21 |
| 4,681,141 | 7/1987 | Wang | 137/607 |
| 4,743,120 | 5/1988 | Bowen | 374/147 |
| 4,756,030 | 7/1988 | Juliver | 4/192 |
| 4,774,978 | 10/1988 | Lepine, Jr. et al. | 137/334 |
| 4,774,982 | 10/1988 | Chen | 137/607 |
| 4,775,101 | 10/1988 | Hall | 236/93 B X |
| 4,778,108 | 11/1988 | Fisher | 236/80 R |

FOREIGN PATENT DOCUMENTS 1087578 4/1985 Italy .

*Primary Examiner*—William E. Tapolcai

[57] ABSTRACT

The invention is directed to a novel manually overrideable heat sensitive valve. In a particular embodiment, this invention is directed to a novel faucet aerator which contains the valve. The faucet aerator, when affixed to a water faucet, can stop the flow of water when harmful temperatures are reached. The invention incorporates an external bypass means enabling the user to access higher temperatures when needed or to restart the flow of water. The Anti-Scald Aerator comprises (a) a thermal actuated valving means for automatically restricting the flow of water; (b) air and water mixing means (Aerator Component) for producing a foam-like flow of water; (c) Manually operated reset or bypass means for overriding the thermal valve; and (d) connecting housing means for securing the aerator to a water supply.

17 Claims, 3 Drawing Sheets

MANUAL OVERRIDE HEAT SENSITIVE VALVE

FIELD OF THE INVENTION

This invention relates to a novel manually overrideable heat sensitive valve. In one particular embodiment, the invention pertains to a water faucet aerator which prevents scalding water from emitting from a faucet.

BACKGROUND OF THE INVENTION

A heat sensitive valve is useful in closing fluid flow in a line when a predetermined temperature is reached. However, once the valve closes, it can only be reopened by lowering the temperature in the valve. This can take time.

Water faucet aerators have been designed and manufactured for more than sixty years, providing such features as splash reduction, economical flow rates, low plumbing noise, consistent stream diameter, stream straightness, clog resistance and low side spray. Sometimes, scalding water can come out of the faucet without warning thereby possibly burning the faucet user. An anti-scald feature is not typically incorporated into a common water faucet aerator housing. Attempts to design such a feature have resulted in an add-on attachment that is too costly, large or difficult for people to use.

An anti-scald adapter exists which restricts the flow of hot water at a specified high temperature but incorporates a cumbersome reset system. To reset the adapter, the operator must first shut off the hot water then repeatedly turn off and on the cold water in order to cool down the adapter. This reset procedure is time-consuming, annoying and not user friendly. It does not allow the user access to high temperature water when needed. This anti-scald adapter causes a plumbing condition known as water-hammering. This condition is initiated when the internal valve member closes abruptly against the valve seat and by reciprocating rebounds begins to bounce off and on the seating or sealing position. When the flow of water starts and stops rapidly within the plumbing system, it causes the pipes to knock and shake violently. At times, this can cause damage to joints and seals of the plumbing system, while at the same time producing a loud disturbing noise in the water pipes.

A number of devices and systems have been invented and patented over the years directed to regulating faucet water temperatures. Some of these are identified below.

| U.S. Pat. No. | Title |
|---|---|
| US 3,870,080 | Volume and Temperature Regulating Faucet |
| US 3,791,409 | Temperature Adjusting Water Faucet Device |
| US 3,396,749 | Temperature Control Hot & Cold Water Faucet Attachment |
| US 4,774,982 | Tap Water Temperature Adjusting Device |
| US 4,743,120 | Water Temperature Sensor for Faucet or Shower |
| US 4,681,141 | Light-Detector, Hand-Controlled Faucet with Water Temperature |
| US 3,952,594 | Temperature Registering Faucet Attachment |
| US 4,570,848 | Automatic Bath Water Temperature Control |
| US 4,778,104 | Temperature Responsive Line Valve |
| US 4,480,784 | Hot Water Cutoff Safety Valve for Showers |
| US 4,210,284 | Temperature Limiting Device |
| US 4,756,030 | Bathroom Controller |
| US 3,648,724 | Thermostatically Controlled Bathroom Safety Appliance |
| US 4,774,978 | Safety Mechanism for Hot-Water Dispenser |
| US 4,148,697 | Safety Mixing Tap for Wash Basin |

SUMMARY OF THE INVENTION

A novel manually overrideable temperature sensitive valve which closes the flow of fluid in a line when a predetermined temperature is reached but can be opened manually when required, rather than wait for the valve to cool down below the predetermined temperature.

An anti-scald aerator containing the manually overrideable temperature sensitive valve has been invented which can be incorporated into common water faucet aerator designs. This thermo-actuated valve is miniature in size and has been designed to automatically shut off the flow of hot water when scalding potentially harmful temperatures are reached. At the same time, the user is permitted deliberate access to high temperature water by actuating an external bypass means, such as a button, to restart the flow of hot water for quick temperature recalibration. Water-hammering is controlled or eliminated by regulating the speed in which the valve member is allowed to close against the seating or sealing position of the valve.

The invention relates to a manually overrideable thermo-actuated valve which comprises (a) a housing means which is adapted to be inserted in a fluid flow conduit, the housing permitting fluid to flow through the housing; (b) a thermo-actuated member which terminates the flow of fluid through the housing when a predetermined temperature is exceeded; and (c) manually operable means which is adapted to open the thermo-actuated member upon manual actuation.

The invention in another aspect pertains to an anti-scald water faucet aerator attachment which comprises (a) a hollow valve housing; (b) an orifice in the housing adapted to enable water to pass through the housing; (c) a temperature sensing means which is adapted to close the orifice when water passing through the orifice reaches a prescribed temperature; and (d) manually operated means which enables the water sensitive orifice closing means to be opened by the user of the anti-scald water faucet aerator attachment.

In the aerator attachment, the water temperature sensing means can be a resilient metal means which is in a compressed condition at low temperatures but extends to an extended position when subjected to elevated temperatures. The temperature sensitive resilient means, when activated by elevated temperatures, can cause a valve means to be seated against a valve seat means in the orifice thereby closing the orifice. The valve housing can contain a water inlet which communicates with a water outlet.

In the aerator as defined, temperature expansion means can close the connection between the water inlet and the water outlet when water flowing through the valve housing reaches a prescribed elevated temperature. The connection closing means can be a valve means which is activated by the temperature sensitive means and is forced into a seat located in the connection between the water inlet and the water outlet. The valve override means can be a spring loaded manually depressible means penetrating into the valve housing, which manually depressible means when depressed manually causes the valve means to move away from the seat means, when the valve means is seated against the seat means.

In the apparatus as defined above, the manually depressible means can be linked to the valve means by a rod extending from the manually depressible means to the valve means. The rod can be held in place around its circumference by a resilient O-ring secured in the valve housing The outwardly extending path of travel of the manually depressible means can be restricted by a stop means. The components of the apparatus can be sealed to prevent the passage of water between the various components. The heat sensitive means can be a metal alloy which is formulated to expand at a prescribed elevated temperature and can be in the form of a helical coil. The valve means can be a sphere. The seating means can be composed of a resilient material which mates with the sphere in a watertight manner when the sphere is depressed by the heat sensitive means against the resilient seating means and a compression spring can hold the sphere against the thermo spring in a valve open position, when the heat temperature sensitive spring is not activated by elevated temperature.

The invention is also directed to an anti-scald aerator for a water faucet comprising (a) a thermally actuated valve means mounted in the aerator, for automatically restricting the flow of water from the faucet when a prescribed elevated water temperature is reached; (b) an air and water mixing means for producing a foam-like flow of water from the faucet; (c) manually operated bypass means for overriding the thermal valve means when the valve means is activated by elevated water temperature; and (d) connecting means adapted for securing the aerator to a water faucet.

BRIEF DESCRIPTION OF THE DRAWINGS

In drawings which illustrate specific embodiments of the invention, but which drawings should not be construed as restricting the spirit or scope of the invention in any way.

DETAILED DESCRIPTION OF SPECIFIC EMBODIMENTS OF THE INVENTION

Figure 1:
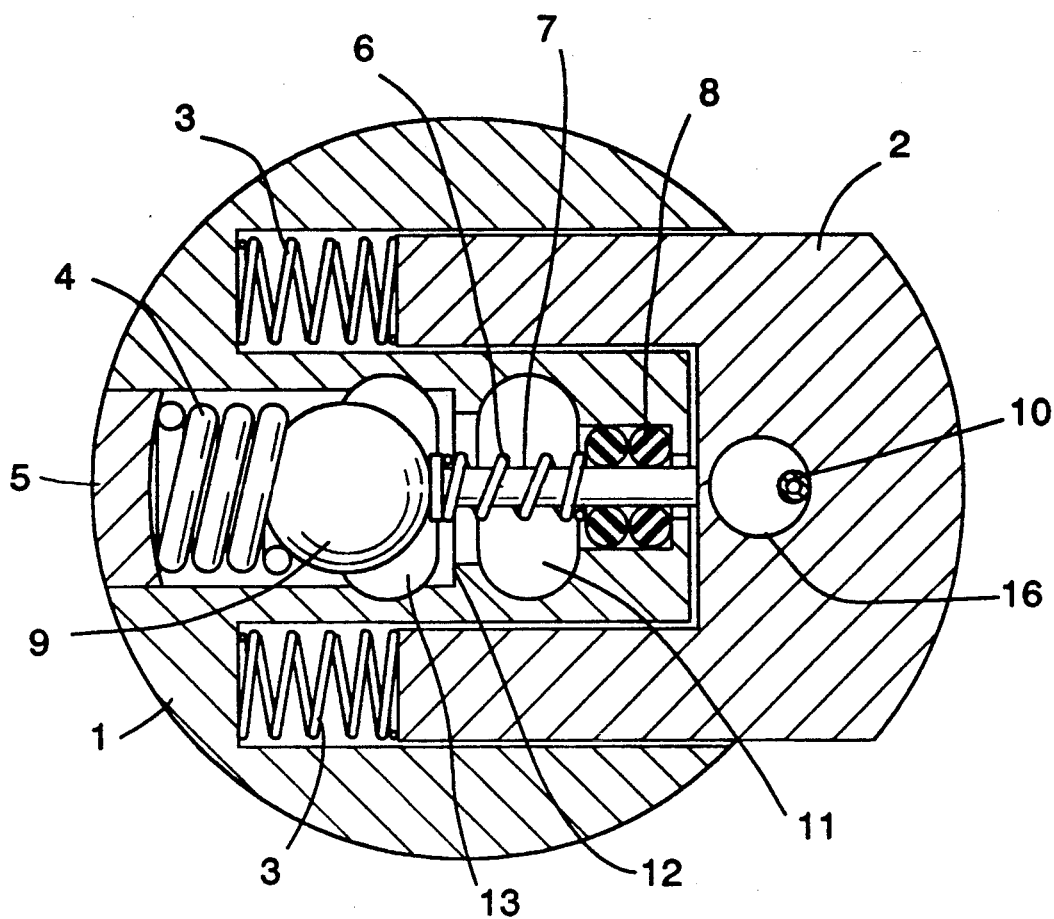
FIG. 1 represents a cross-sectional top view of the manually overrideable thermal valve in a reset open position.
Figure 5:
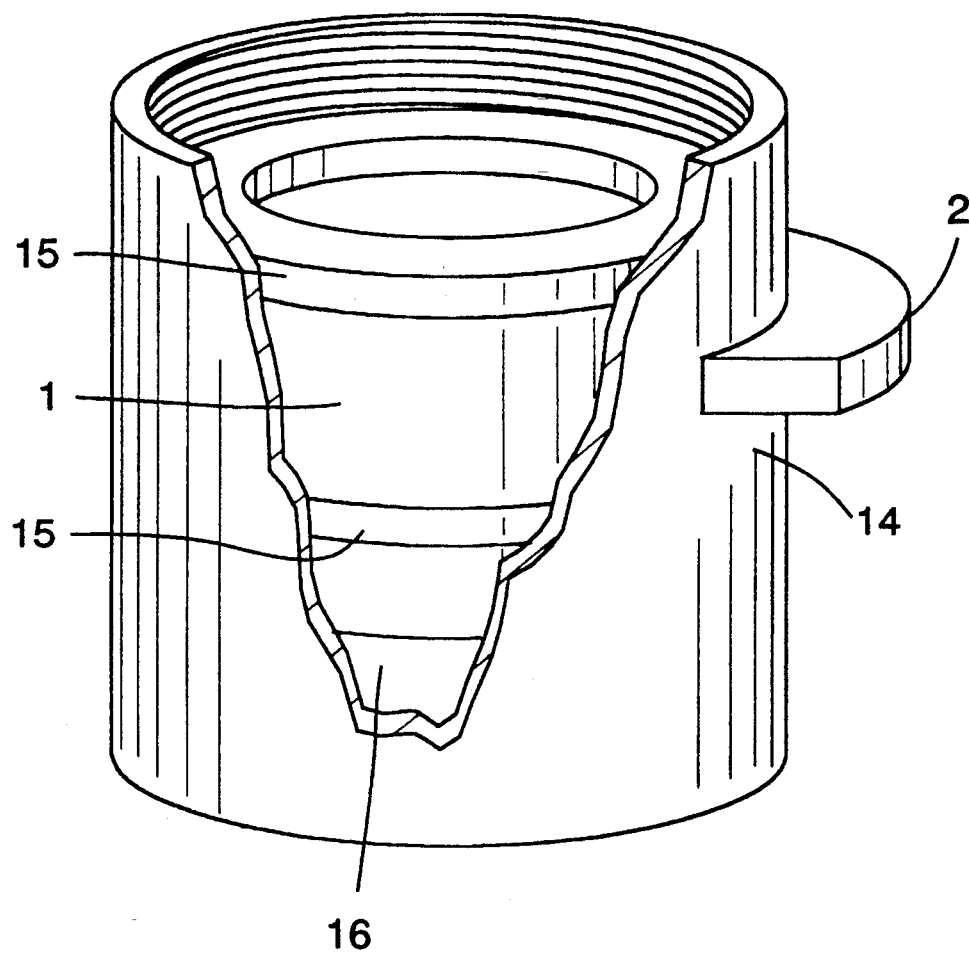
FIG. 5 represents an isometric partially cut-away view of the thermal valve within an water faucet aerator housing.

Referring to the drawings, FIG. 1, which illustrates a cross-section top view of the thermal valve 1, and FIG. 5 which represents an isometric view of the thermal valve 1 in an water faucet aerator 14, the basic invention of a manually overrideable thermo-actuated valve is held within the aerator housing 14 and sandwiched between two sealing washers 15 held within the interior of the aerator housing 14. When the aerator 14 is tightly connected to a faucet (not shown) and water pressure is applied, the water flows into and through the water inlet hole 13 and out through the water outlet hole 11 (as seen in FIG. 1). The water is restricted by seals from escaping out and around the external bypass button 2. The two sealing washers 15, as in FIG. 5, restrict any water from leaking through the hole in which the locking pin 10 is installed vertically through bypass button 2. An aerator element 16 (FIG. 5) is provided which functions to mix air with the water flowing through the aerator so as to produce a foam-like flow of water from the faucet. A resilient plug 5 is also used to prevent water leaking in between the sealing washers 15. The result is a leak free assembly.

Figure 2:
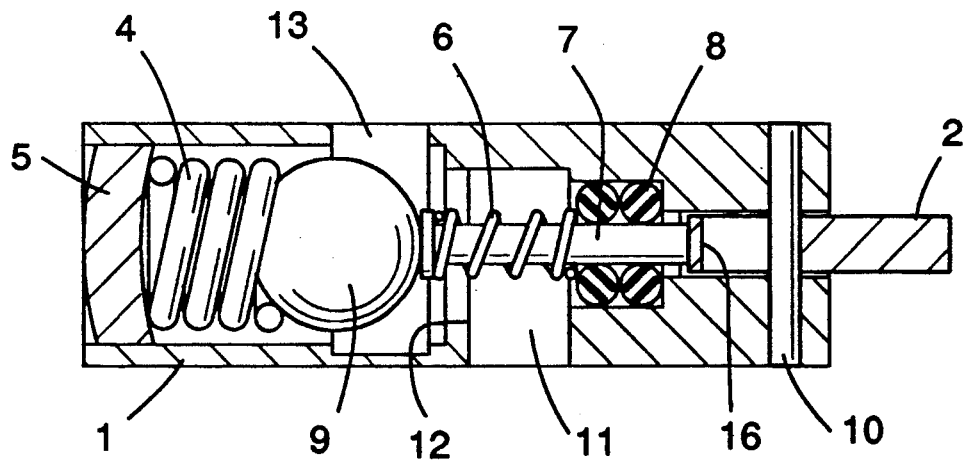
FIG. 2 represents a cross-sectional view of the thermal valve in a reset open position.

As seen in FIGS. 1 and 2, which illustrate top and side section views of the components and construction of the thermal valve assembly, the components of the valve are housed in a valve body 1. A bypass button 2 extends from one side of the valve body 1. The bypass button 2 is maintained in an extended horizontal position by a pair of compression coil springs 3. Bypass button 2 is connected internally to a horizontal pin 7 which at the end opposite the button 2 impinges water sealing ball 9. Ball 9 in turn impinges thermal spring 4, which abuts sealing plug 5. Connecting pin 7 extends through and has a helical compression spring 6 around part of its length. Spring 6 serves to hold ball 9 in a left-most position (as seen in FIGS. 1 and 2) unless compressed strongly The end of the pin 7 adjacent button 2 has a pair of O-rings 8 around it. These prevent water leaking past pin 7 and button 2. A vertical lock pin 10 prevents button 2 from being ejected from valve body 1 by the pair of compression coil springs 3. A water inlet hole 13 is machined in the top surface of the body 1 while a water outlet hole 11 is machined in the bottom surface of the body 1. The inlet hole 13 and outlet hole 11 are sealed from one another by sealing edge 12. Edge 12 also serves as a seal seat for ball 9 when ball 9 is forced against it.

As seen in FIGS. 1 and 2, water passes through the water inlet hole 13 (which is installed on the water inlet side) and circulates around the helical thermal spring 4 and the steel ball 9. The water then passes by horizontal pin 7 and helical spring 6 into the inverted water outlet chamber having a water outlet hole 11 on the opposite side of the thermal valve body 1. This side of the valve body 1 is installed away from the water supply. Thermal spring 4 is heat sensitive and expands quickly when a certain specified temperature is reached.

Figure 3:
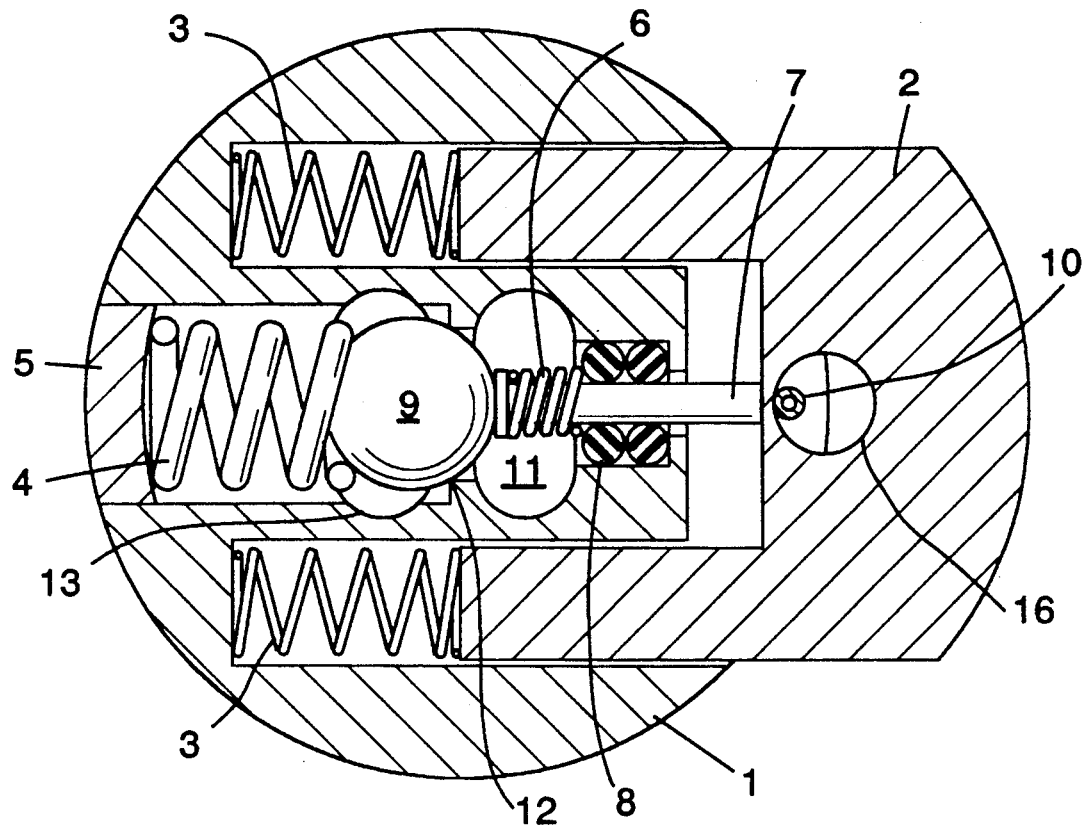
FIG. 3 represents a cross-sectional top view of the thermal valve in a closed position.
Figure 4:
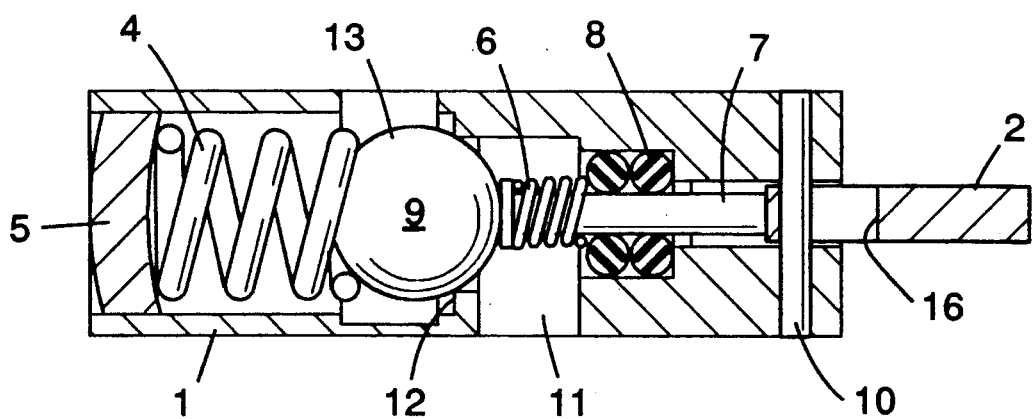
FIG. 4 represents a cross-sectional side view of the thermal valve in a closed position.

When the temperature of the water circulating around the thermal spring 4 rises to a specific temperature, its length begins to increase relatively rapidly. This increase in length pushes the ball 9 against the pin 7 which is normally held in a left-most position (open) by spring 6. When the water temperature rises to a point where it causes thermal spring 4 to reach its maximum length, spring 4 forces the ball 9 to the right where it is firmly seated against sealing edge 12. FIGS. 1 and 2 show the thermal valve in an open position. The thermal spring is in a compressed condition and ball 9 is held away from sealing edge 12 by spring 6. Water can therefore pass through from the inlet 13 to the outlet 11. FIGS. 3 and 4 show the ball 9 seated against sealing edge 12 and blocking off any water in inlet 13 from entering into the water outlet chamber 11. The speed at which the ball 9 moves upon closing by expanding thermal spring 4 is governed by the surface drag of the pin 7 within the O-Rings 8.

If the user requires the interrupted hot water to flow again, the user pushes in the bypass button 2. This action pushes the pin 7 against the ball 9 which moves it away from the sealing edge 12. If the temperature of water is not lowered while the bypass button is depressed, thereby neutralizing spring 4, the ball 9 will reseat against the sealing edge 12 when the bypass button 2 is released. However if the water temperature is lowered, the thermal spring 4 relaxes and pin 7, by means of the spring 6, holds the ball 9 against the thermal spring 4 in an open position. The spring 6 always insures that the pin 7 is pressed against the ball 9 so that whenever the ball 9 is forced to move towards a closed position, its speed is dampened by O-ring 8 drag. The two springs 3 insure that the force of the thermal spring 4 never overcomes the additional resistance of the bypass button 2. Likewise, locking pin 10 ensures that, the button 2 does not extend past a certain point. By pass button 2 can be moved within the distance provided by hole 16.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. A manually overridable thermo-actuated valve which comprises:
    (a) a valve housing means which is adapted to be inserted in a fluid flow conduit, the valve housing holding a valve means which permits fluid to flow through the housing when the valve means is in an open position and terminates fluid flow through the housing when the valve means is in a closed position;
    (b) a heat sensitive thermo-actuated metal alloy resilient helical spring member which is mounted in the valve housing means and when a predetermined fluid temperature is reached actuates the valve means to a closed position to terminate the flow of fluid through the housing and permits the valve means to return to an open position when the fluid temperature falls below the predetermined temperature; and
    (c) a non-lockable manually operable means associated with the valve housing means, which operable means upon manual actuation is adapted to override the resilient helical spring member and cause the valve means to open and permit fluid to flow through the housing means.

2. An anti-scald water faucet aerator attachment which comprises:
    a. a hollow valve housing;
    b. an orifice in the housing adapted to enable water to pass through the housing;
    c. a heat sensitive metal alloy means which is housed in the valve housing and is adapted to cause a valve means to close the orifice when water passing through the orifice reaches a prescribed temperature and permits the valve means to open the orifice when the water temperature falls below the prescribed temperature; and
    d. a non-lockable manually operated means which upon manual actuation overrides the metal alloy means and causes the valve means to open the orifice and enable water to pass through the housing.

3. An aerator attachment as claimed in claim 2 wherein the heat sensitive metal alloy means is a metal alloy thermal spring which is in a compressed condition at temperatures below the prescribed temperature but extends to an extended position when subjected to temperatures above the prescribed temperature.

4. An aerator attachment as claimed in claim 3 wherein the thermal spring, when activated by temperatures above the prescribed temperature, causes a valve means to be seated against a valve seat means in the orifice thereby closing the orifice.

5. An aerator attachment as claimed in claim 4 wherein the valve housing contains a water inlet which connects by the orifice with a water outlet.

6. An aerator as claimed in claim 5 wherein the thermal spring caused the valve means to seat against the valve seat means to close the connection between the water inlet and the water outlet when water flowing through the valve housing reaches a prescribed elevated temperature.

7. A valve as claimed in claim 6 wherein the valve means is a sphere which is moved by the thermal spring against the valve seat means located in the connection between the water inlet and the water outlet.

8. A valve as claimed in claim 7 wherein the valve override means is a spring loaded manually depressible means penetrating into the valve housing, which manually depressible means when depressed manually causes the valve means to move away from the sealing valve seat means, when the valve means is seated against the seat means.

9. An apparatus as claimed in claim 8 wherein the manually depressible means activates the valve means by a rod extending from the manually depressible means to the valve means.

10. An apparatus as claimed in claim 9 wherein the rod is held in place around its circumference by at least two resilient O-rings secured in the valve housing.

11. An apparatus as claimed in claim 10 wherein the outwardly extending path of travel of the manually depressible means is restricted by a stop means.

12. An apparatus as claimed in claim 11 wherein the components of the apparatus are sealed to prevent the passage of water between the various components.

13. An apparatus as claimed in claim 12 wherein the heat sensitive means is a metal alloy which is formulated to expand at a prescribed elevated temperature.

14. An apparatus as claimed in claim 2 wherein the heat sensitive metal alloy means is in the form of a helical coil.

15. An apparatus as claimed in claim 14 wherein the valve means is a sphere.

16. An apparatus as claimed in claim 15 wherein the valve seating means is composed of a resilient material which mates with the sphere in a watertight manner when the sphere is depressed by the heat sensitive means against the resilient seating means.

17. An apparatus as claimed in claim 16 wherein a compression spring holds the sphere against the helical coil in a valve open position, when the heat temperature sensitive helical coil is not activated by elevated temperature.

* * * * *